United States Patent [19]

Oeynhausen et al.

[11] Patent Number: 4,741,630
[45] Date of Patent: May 3, 1988

[54] DEVICE FOR THE LEAKAGE-FREE REMOVAL OF BEARING OIL FROM SLIDING BEARINGS FOR ROTATION SHAFTS OF HIGH-SPEED MACHINES

[75] Inventors: Heinrich Oeynhausen, Muelheim; Ernst Winkelhake, Bochum, both of Fed. Rep. of Germany

[73] Assignee: Kraftwerk Union Aktiengesellschaft, Mülheim, Fed. Rep. of Germany

[21] Appl. No.: 48,517

[22] Filed: May 4, 1987

Related U.S. Application Data

[63] Continuation of Ser. No. 905,670, Sep. 9, 1986, abandoned.

[30] Foreign Application Priority Data

Sep. 9, 1985 [DE] Fed. Rep. of Germany ....... 3532043
Nov. 29, 1985 [DE] Fed. Rep. of Germany ....... 3542316

[51] Int. Cl.$^4$ ........................................... F16C 17/02
[52] U.S. Cl. ..................................... 384/144; 384/397
[58] Field of Search ............... 384/144, 397, 135, 136, 384/400, 403

[56] References Cited

U.S. PATENT DOCUMENTS

| | | |
|---|---|---|
| 2,846,245 | 8/1958 | Weaver . |
| 3,104,921 | 9/1963 | Newcomer .......................... 384/400 |
| 3,198,590 | 8/1965 | Benedetti ............................ 384/403 |
| 3,574,478 | 4/1971 | Toth et al. . |
| 4,345,797 | 8/1982 | Ballheimer ......................... 384/397 |
| 4,348,067 | 9/1982 | Tooley ................................. 384/144 |
| 4,468,066 | 8/1984 | Alcorta et al. . |
| 4,525,995 | 7/1985 | Clark . |

FOREIGN PATENT DOCUMENTS 1195111 6/1965 Fed. Rep. of Germany .
2091356 7/1982 United Kingdom .

Primary Examiner—Lenard A. Footland
Attorney, Agent, or Firm—Herbert L. Lerner; Laurence A. Greenberg

[57] ABSTRACT

An assembly for the leakage-free removal of bearing oil from sliding bearings for rotating shafts of high-speed machines, includes a sliding bearing axially divided into bearing cups, contactless shaft seals near bearing end surface preventing escape to the surroundings of bearing oil fed to surfaces of the sliding bearing, an annular oil collecting canal disposed at least at one side of the sliding bearing between a shaft seal and a bearing end surface having an outer peripheral wall with an arcuate cutout formed therein with a slot-shaped opening arc defining an outlet opening through which the collecting canal discharges an oil flow, the opening arc covering a circumferential angular range of the shaft extending at least from the geodetically lowest point of the outer contour of the collecting canal at most to a position of the outer contour defined by the parting line of the cups as seen in shaft rotation direction, an oil collecting box with an oil flow space and an inlet opening matched to the outlet cross section of the opening arc and sealed to the opening arc for receiving oil from the outlet opening, tangentially arched baffles dividing the oil flow space into a plurality of oil flow channels for dividing an oil spray fan downwardly thrown off from the lower surface of the shaft and downwardly deflecting oil sprays thereof, and a common downwardly directed transition piece receiving the oil flow from the oil flow channels.

9 Claims, 5 Drawing Sheets

DEVICE FOR THE LEAKAGE-FREE REMOVAL OF BEARING OIL FROM SLIDING BEARINGS FOR ROTATION SHAFTS OF HIGH-SPEED MACHINES

This application is a continuation of application Ser. No. 905,670, filed Sept. 9, 1986, abandoned.

The invention relates to a device for the oil-free removal of bearing oil from sliding bearings for rotating shafts of high-speed machines, including contactless shaft seals preventing the escape to the surroundings of bearing oil fed under pressure to the surfaces of the sliding bearing in the vicinity of two bearing end faces, and an annular oil collecting canal disposed at least at one side of the axially split bearing between the shaft seal and the bearing end surfaces, discharging through at least one oil outlet into an oil collecting device communicating with a bearing oil drain.

Conventional sliding bearings for turbomachines, especially steam turbines, which may involve radial bearings, thrust bearings or combination radial and thrust bearings, generally have contactless shaft seals in the vicinity of the two bearing end surfaces, in order to prevent the escape to the surrounding of the bearing oil fed to the surfaces of the sliding bearing under pressure. The tightness of the shaft seal represents a special problem; it should be as free of leakage oil as possible. In close relationship with this desired freedom from leakage oil is the problem of carrying away the bearing oil. Towards this end, the sliding bearings have an annular oil collection canal, at least on one side. This annular oil collecting canal discharges through at least one discharge opening, into an oil collecting device which, in turn, communicates with the bearing oil circulation system.

The problem of unhindered bearing oil removal in a wide range of speeds from standstill or start-up to the operating speed, is encountered especially in sliding bearings for shafts of high-speed machines in which a high circumferential speed of e.g. 40 m/sec prevails at the bearing point during operation. Such machines therefore, particularly include turbomachines whose operating speed in most cases is either near 1500 rmp (nuclear powered machines) or near 3000 rpm (steam turbines for conventional power stations). In the USA, the corresponding speeds are 1800 and 3600 rpm, respectively, because of the 60 Hz line frequency. At these high circumferential speeds, the bearing oil is thrown off the outer surface of the shaft and tends to develop a great deal of foam. It must be carried away promptly because an oil backup could otherwise form in the annular oil collecting canal.

It is accordingly an object of the invention to provide a device for the leakage-free removal of bearing oil from sliding bearings for rotating shafts of high-speed machines, which overcomes the hereinfore mentioned disadvantages of the heretofore-known devices of this general type, so that a prompt removal of the bearing oil flowing off the sliding bearing surfaces is assured in all operating states, i.e. over the entire range of possible speeds, from standstill through the speed-up to the operating speed. In particular, this device should assure this prompt oil removal despite formation of oil foam while preventing any oil backup. A subordinate object is to construct the device in such a way that the prompt removal of the principal bearing oil flow is utilized to improve the removal of the leakage oil from the leakage oil collecting chamber of the shaft seal.

With the foregoing and other objects in view there is provided, in accordance with the invention, an assembly for the oil leakage-fee removal of bearing oil from sliding bearings for rotating shafts of high-speed machines, especially turbomachines, comprising a shaft with an outer surface rotating in a given direction throwing off an oil spray fan including oil sprays from a downwardly directed portion of the outer surface, a sliding bearing having sides and being axially divided into bearing cups along a parting line and having sliding bearing surfaces supporting the shaft and two bearing end surfaces, contactless shaft seals in the vicinity of the bearing end surfaces preventing escape to the surroundings of bearing oil fed under pressure to the sliding bearing surfaces, an annular oil collecting canal disposed at least at one of the sides of the sliding bearing between one of the shaft seals and one of the bearing end surfaces, the annular oil collecting canal having an outer contour with a geodetically lowest point and an outer peripheral wall having an arcuate cutout formed therein with a slot-shaped opening arc defining at least one outlet opening through which the annular oil collecting canal discharges an oil flow, the opening arc having an outlet cross section and covering a circumferential angular range of the shaft extending at least from the geodetically lowest point of the outer contour at most to a position of the outer contour defined by the parting line as seen in the given shaft rotation direction, an oil collecting box having an oil flow space therein and having an inlet opening formed therein matched or dimensioned according to the outlet cross section of the opening arc and sealed to the opening arc for receiving oil from the outlet opening, tagentially arched baffles dividing the oil flow space into a plurality of oil flow channels for dividing the oil spray fan and downwardly deflecting the oil sprays thereof, and a common downwardly directed transition piece or adapter receiving the oil flow from the oil flow channels and leading it to an oil drain.

In accordance with another feature of the invention, the oil flow space and at least a part of the oil flow channels are steadily reduced in size as seen from the inlet opening to the transistor piece.

In accordance with an added feature of the invention, the oil collection box has end walls or base surfaces extending along axial direction of the shaft and being reduced in size substantially in the shape of a curved bell-shaped end of a trumpet.

The advantage achievable with the invention are seen primarily in that during standstill, speed-up and throughout the range of speed up to the operating speed, the oil is deflected from the baffles of the oil collecting box into a downwardly directed drainage channel, in which process the baffles disposed in fan-like fashion and located relatively higher as viewed in shaft rotation direction, become more and more effective as the shaft speed increase while the relatively lower baffles are effective at lower speeds. This favors prompt removal of the oil foam and prevents eddy formation within the oil flow. The oil collecting box discharges, in particular, in a vertical oil drainage channel which, in turn, discharges in the bearing housing so that the oil is fed to an oil collecting tank. Even more advantageous, however, is a direct connection to the oil drainage line leading to the oil collecting tank. This causes the oil flow surfaces exposed to air to be considerably reduced (ensuring no spraying oil and no oil mist in the bearing housing) which in turn recuces the oil preparation costs and also increase the life of the bearing oil.

In accordance with an additional feature of the invention, there is provided a sealing chamber axially upstream of the annular oil collecting canal, as seen in direction toward the at least one side of the sliding bearings or in oil flow direction, the sealing chamber having an annular wall with an inner periphery and upper and lower annular wall halves, the shaft seals being in the form of a labyrinth seal having a multiplicity of sealing rings mutually spaced apart on the inner periphery of the annular wall, the sealing rings having peaks encompassing or surrounding the outer surface of the shaft with little clearance, a leakage oil collecting chamber substantially enclosing the essential part of the lower annular wall half and sealing the lower annular wall half from the surroundings, the leakage oil collecting chamber communicating with the sealing chamber through a multiplicity of oil drainage holes formed in the annular wall in the spaces between the sealing peaks, and the leakage oil collecting chamber having driving nozzles disposed thereon covering axially oriented suction holes formed in the leakage oil collecting chamber preventing a direct oil inflow and generating suction in the space of the opening arc for conducting the drainage oil flow from the oil drainage holes.

In accordance with an additional feature of the invention, the driving nozzles are suction caps each being formed of a half shell of a hollow part covering the suction holes and having a conical or wedge-shaped blower point in an oil inlet direction and an opening in an oil flow outlet if drainage direction.

In this way a substantial improvement of the shaft seal tightness is achieved. Due to the channel constriction caused by the suction caps, the flow velocity is increased locally in this oil drainage flow, resulting in a suction effect. Consequently, the leakage oil is transported from the leakage oil collecting chamber into the oil drainage flow by the suction caps, thereby completely carrying away not only the oil, but also the oil foam.

In accordance with again another feature of the invention, the oil collecting box has relatively narrow and relatively wide sides and rubber-elastic sealing strips pre-stressed against the outer peripheral wall of the annular oil collecting canal, in the assembled condition of the oil collecting box.

In accordance with a concomitant feature of the invention, there is provided a partial chamber having a substantially L-shaped peripheral wall defining a substantially traingular cavity as seen in plan view, an inlet opening in an oil inlet direction and an oil outlet opening in an oil flow outlet direction, for aspirating leaked oil in the cavity with suction generated by the oil flow.

Other features which are considered as characteristic for the invention are set forth in the appended claims.

Although the invention is illustrated and described herein as embodied in a device for the leakage-free removal of bearing oil from sliding bearings for rotating shafts of high-speed machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
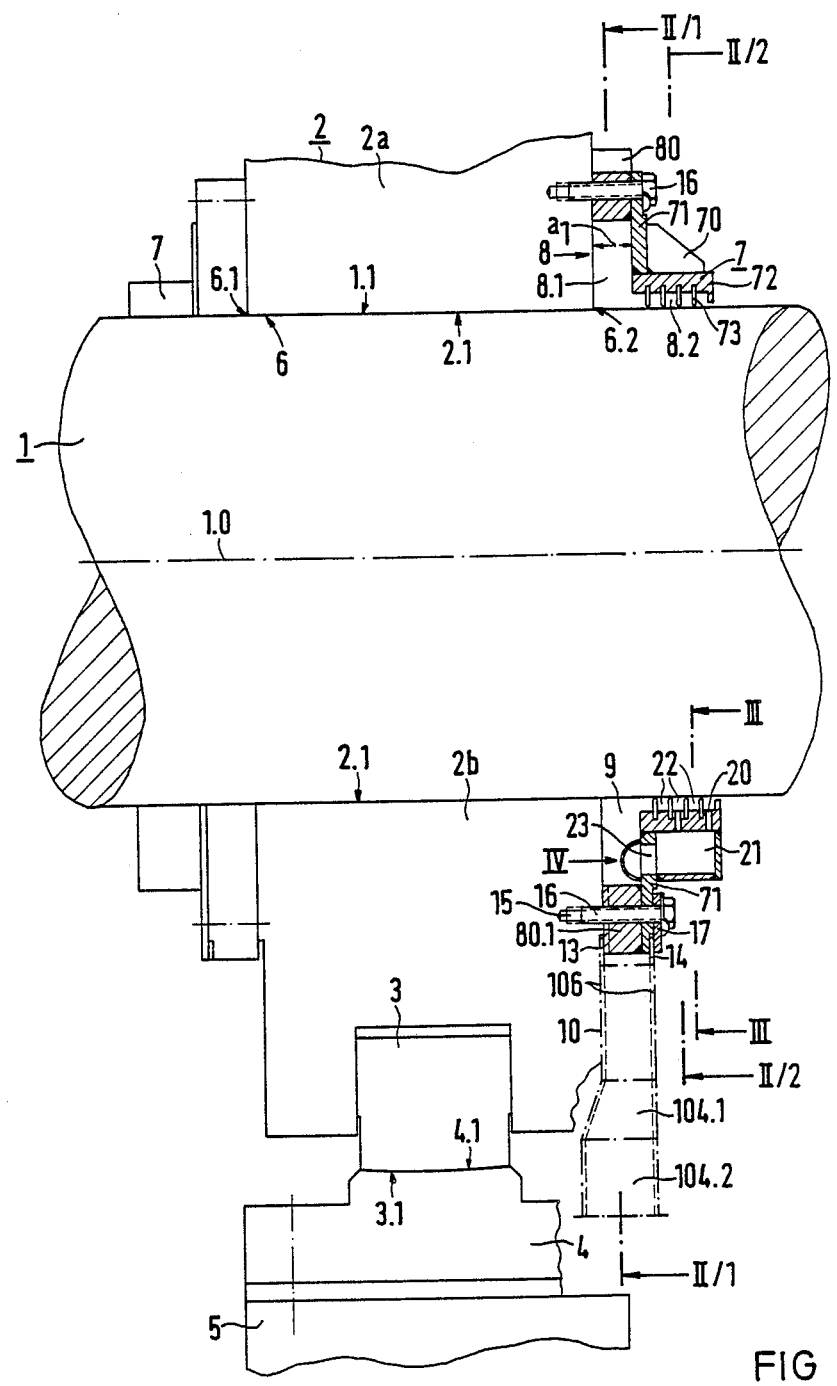
FIG. 1 is a fragmentary, diagrammatic, partly cross-sectional view of a steam turbine shaft support bearing taken along the line I—I in FIG. 2, in the direction of the arrows, in which only the outer contour of the support bearing is shown while the device according to the invention which is disposed at the right end of the support bearing is shown in detail.

Referring now to the figures of the drawings in detail and first, particularly, to FIG. 1 thereof, there is seen a shaft 1 with a shaft axis 1.0 of a non-illustrated steam turbine mounted in a sliding bearing 2 constructed as a radial bearing which, in the illustrated embodiment, has a diameter of 250 mm which corresponds to a circumferential speed of approximately 40 m/sec$^{-1}$ at a speed of 3000 revolutions per min $^{-1}$. When such high circumferential shaft speeds are used, the oil removal in the vicinity of the end surface of the sliding bearing 2 and the sealing of the shaft, represents a special problem. The bearing surface of the shaft is designated with reference numeral 1.1 and the bearing surfaces of the sliding bearing with reference numeral 2.1. The sliding bearing is formed of an upper and a lower bearing cup 2a, 2b, the inner periphery thereof forming the bearing surface 2.1 and being flanged together in a non-illustrated manner particularly at an axial parting line. A similarly axially divided bearing bracket with a bearing support 3 encircles the two bearing cups; the lower region of the bearing support 3 is mounted by means of concave countersurfaces 4.1 of a support platform 4 with so-called spherical adjustability for the sliding bearing 2, the support platform 4 being anchored to a horizontal base member or foundation lock 5 which is not shown in detail. The bearing cups 2a, 2b are provided in the vicinity of the inner peripheries thereof with non-illustrated oil canals or channel which have oil outlets discharging in a bearing gap between the surfaces 1.1–2.1. The pressurized oil supplied to the oil canals on the inlet side evenly reaches the entire periphery of the shaft 1 through the outlets leading into the bearing gap. The special construction of the oil canals is immaterial within the scope of the present invention, nor does it matter whether a two-key, three-key or similar bearing is involved. It only matters that the pressurized oil fed to a lubricating gap 6 between the sliding bearing surfaces 2.1 and the outer bearing surface 1.1 of the shaft discharges or oozes out at the end surfaces of the sliding bearing i.e. at surfaces 6.1 and 6.2 and is promptly carried away from the end surfaces of the shaft as leak-free as possible and without backing up. The bearing oil may also be oil for a shaft lifting device which is introduced into the gap 6 in the lower region of the sliding bearing surfaces 2.1 and serves to keep the bearing friction low when the shaft is being brought from a standstill to starting speed and from the starting speed to an operating speed. The pressurized oil of the shaft lifting device is no longer required above a certain shaft speed because the shaft lubrication in the lubricating gap is sufficient due to a hydro-dynamic pressure buildup. At any rate, the oil flow is considerable. This is because the bearing oil must not become too hot in order to retard its aging, for which reason it contains an oil cooling component.

The right end surface region of the sliding bearing 2 of FIG. 1 is discussed in greater detail below, and the left end surface region may be of identical or similar construction. The space bounded by shaft seals 7 which are only shown in outline in the left part of FIG. 1 is generally designated with reference numeral 8; a part of the space 8 is formed of an annular oil collecting canal 8.1, bordering the shaft 1 over a limited axial length $a_1$, which is 20 mm in the illustrated embodiment, and discharging through an oil outlet opening 9 in the lower region of the shaft 1, in an oil collecting device 10 which communicates with an oil collecting vessel through a drainage canal in a non-illustrated manner. For example, the bearing oil may first be conducted from the oil collecting device into the bearing housing and then by gravity into the oil collecting vessel as is known according to the state of the art.

Figure 2:
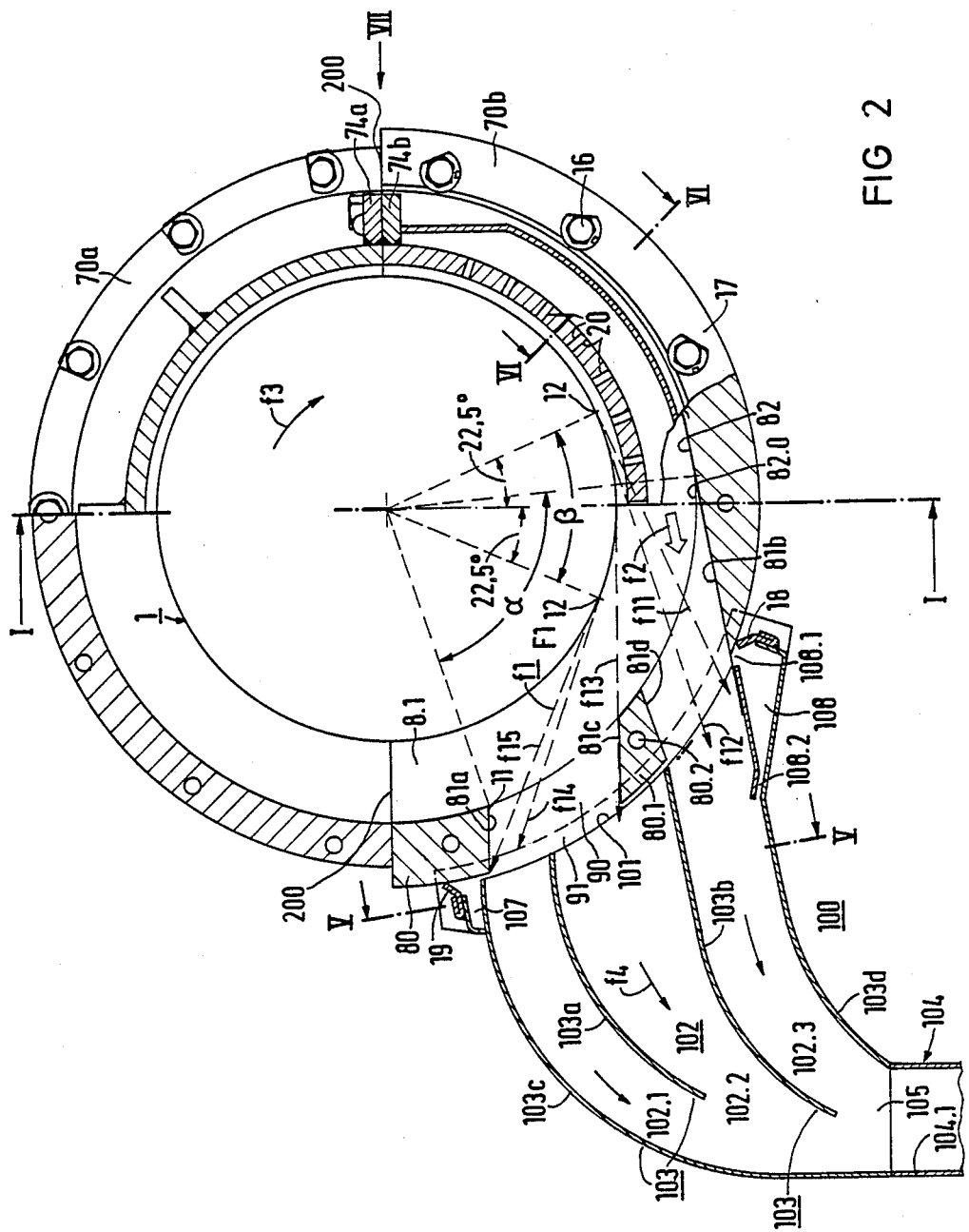
FIG. 2 is an overall cross-sectional view taken along the line II—II in FIG. 1 in the direction of the arrows, being divided into axially offset semisections taken along the lines II/1—II/1 and II/2—II/2 in FIG. 11, although the planes II/1—II/1 and II/2—II/2 of the two semisections are also shown in FIG. 1 for better comprehension.

FIG. 2 shows that in order to form the oil outlet opening 9, an annular, outer peripheral wall 80 of the annular oil collecting canal 8.1 is cut out over a circular sector in the form of a slot-shaped opening are 90 defined in the circumferential direction by milled edges 81a (upper edge), 81b (lower edge), the upper edge 81a being virtually horizontal and the lower edge 81b being inclined by a 10° angle relative to the horizontal so that an oil spray fan F1 diagrammatically indicated by broken-line arrows f1 and an oil flow coming out of the annular canal 81 at low speed as seen by an arrow f2, can be conducted without deflection directly into an oil collecting box 100 downstream. The same applies to upper and lower limiting edges 81c, 81d of a stationary, prismatic wall portion 80.1 of the outer peripheral wall 80 which serves as a spacing element when fastening the oil collecting box 100 (also seen in FIG. 1) and has a passageway 80.2 formed therein for a fastening screw 16 (seen in FIGS. 1 and 2). In practice, this portion 80.1 does not hinder the oil transport within the oil spray fan F1 and helps to divide it into partial sprays.

The opening arc 90 covers a circumferential angular area $\alpha \approx 75°$ of the shaft 1, starting at least at the geodetically lowest point 82.0 of the outer contour 82 of the annular canal 80.1 and extending at least to a point 11 of the outer contour 82 of the annular canal 80.1 located as close as possible to the plane of a bearing cup parting line 200, as viewed in shaft rotation direction. The oil spray fan F1 is shown diagrammatically with the highest point of the inpingement zone of the oil spray fan F1 thrown off the lower surface of the shaft 1 at the greatest operating speed of the shaft 1 in approximately a circumferential angular range $\beta$, without being restricted to this fan configuration. The circumferential angle range $\beta$ at the lower surface of the shaft is about 45° in the illustrated embodiment, namely about 22.5° on both sides of the vertical plane of the axis of the shaft, without being limited to these numbers. The angles $\alpha$ and $\beta$ would be greater if the parting line were turned in the direction of an arrow f3, thereby permitting a larger outlet opening. It becomes clear that oil spray base points 12 are relocated on the shaft surface in the direction of rotation as the circumferential speed of shaft 1 increases, resulting in the diagrammatically indicated fanning, starting at an oil spray f11 oriented obliquely downward relative to an oil spray f15 oriented obliquely upward. According to the arrow f2, the pressurized oil used for the shaft lifting device, or used when the shaft is speeding up, flows with less velocity, even though with a large volume, into the lower inlet area of the oil collecting box 100.

The above-mentioned oil collecting box 100 is connected and sealed to the opening are 90 with an inlet opening 101 appropriately dimensioned according to an inlet cross-section 91, which will be discussed below in greater detail. In order to divide the oil spray fan F1 and deflect its individual oil sprays, bunches or strands f1 or f11 to f15 and in order to also deflect the oil flow according to the flow arrow f2, an oil flow space 102 of the oil collecting box 100 is divided into several parallel oil flow channels. In the illustrated embodiment, the oil collecting box is divided into three mutually parallel channels 102.1, 102.2, 102.3, by means of tangentially arched baffles 103a to 103d. The baffles 103a and 103b are internal baffles, while the baffles 103c and 103d are external baffles which delimit the total volume of the oil flow space 102 and of the two outer oil flow channels 102.1 and 102.3 toward the outside. The oil flow space 102 with its oil flow channels 102.1 to 102.3 empties into a downwardly directed transition piece or adapter 104 welded to the outlet 105 of the collecting box 100. Due to the small width of the annular canal 8.1, the oil collecting box is short along the direction of the shaft axis 1.0; it is a flat box, as indicated by the planar, parallel construction of its two sheet metal end walls 106.

Figure 5:
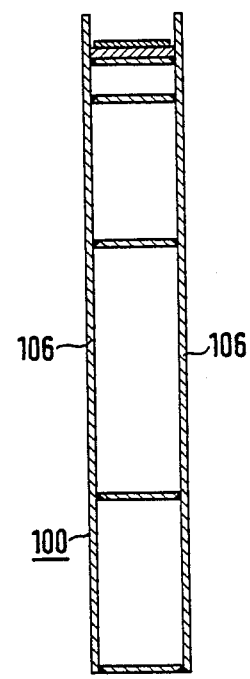
FIG. 5 is a cross-sectional view of an oil collecting box taken along the line V—V in FIG. 2, in the direction of the arrows.
Figure 7:
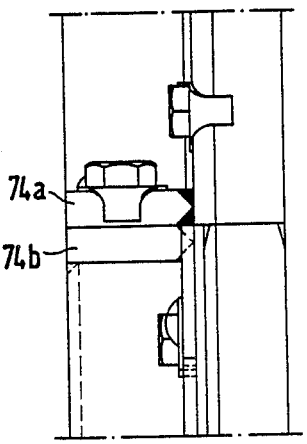
FIG. 7 is a side-elevational view of two annular halves of a labyrinth sealing chamber as seen along an arrow VII in FIG. 2.

It is evident from FIG. 2 that the oil flow space 102 and especially the central oil flow channel 102.2 taper down steadily in oil flow direction (arrows f4), from the cross section of the inlet opening 101 to the connection to the adapter or discharge channel part 104. This causes the oil sprays f11 to f15 to merge gradually in the direction of the arrows f4 so that the oil flow space 102 is filled with oil to a large degree at a connection 105. The tangential arching of the baffles 103a to 103d (designated with reference numeral 102, as a whole), is understood to mean that they follow substantially the same direction as the tangential direction of the oil sprays f1 or of the oil flow f2, thus offering the least possible flow resistance to the introduction of the bearing oil into the oil collecting box, the arcuate curvature of the baffles 103 ane then transformed in the oil deflection area adjoining the oil collecting area into a downward deflection, especially into the vertical direction, as shown. Naturally, a deflection into an obliquely downward direction would be possible also. As FIG. 1 shows, the deflection zone of the oil collecting box 100 is then followed by the adapter 104 for connection to the drainage canal with its larger canal cross section 104.2. It is expedient to constrict the oil collecting box 100 in oil flow direction as shown; the box contour thus obtained is that of a curved telephone mouth piece or bell-shaped end of a trumpet. On the other hand, a constriction caused by having the two end walls 106 approach each other is not advantageous because the fact that they are planar and parallel is desirable for reasons of precise assembly and retention. As FIG. 5 illustrates, the oil collecting box 100 is welded together from thin sheet metal, which may be 2 mm thick. In order to obtain a tight connection of the oil collecting box 100 to the annular oil collecting canal 8.1, arched rim areas of the two end walls 106 of the oil collecting box 100 are pushed into pockets 13, 14, the pocket 13 being formed by an appropriately milled portion of the surface of the lower bearing cup and by the opposite surface of the remaining prismatic wall portion 80.1. The opposite pocket 14 is formed by a milled arch or offset rim and an arcuate web 17 spaced from an annular end wall 71 by the wall thickness of the end walls 106, by means of the fastening screws 16. The fastening screw 16 according to FIG. 1 is located on the same circle as the other fastening screws 16, each being screwed into tapped blind holes 15 of the bearing cup 2, for upper and lower halves 70a, 70b, of an angular ring 70 which are tightened against each other in sealing fashion by means of flanges 74a, 74b shown in FIGS. 2 and 7 which are welded to two halves of an annular wall 72. Due to the small clearances provided in the vicinity of the pockets 13, 14 an oil-tight connection of the oil collecting box can be achieved in this location. In circumferential direction, i.e. at the narrow sides of the oil collecting box 100, the sealing is accomplished rubber-elastically by means of sealing strips 18 in the lower region and sealing strips 19 in the upper region of the oil collecting box 100. The lower sealing strip 18 is disposed in a seating pocket of an approximately L-shaped peripheral wall of a lower partial chamber 108, the interior of which is approximately triangular as seen in a plan view and which has an inlet opening 108.1 facing towards the oil inlet direction and an outlet opening 108.2 facing towards the oil outlet direction. Leakage oil from the pockets 13, 14 is collected in this partial chamber 108 through the inlet opening 108.2 and is returned to the main flow. The upper sealing strip 19 is also correspondingly retained at the end of the free leg of an approximately L-shaped peripheral wall, in a seating pocket of an upper partial chamber 107. Both sealing strips 18, 19 are pushed-in with pre-loading in assembled condition against the outer peripheral wall 80 so as to rest against it in elastically sealing fashion, as shown. Bearing oil injected into the upper partial chamber 107 flows back into the main flow by gravity.

As already mentioned above, the kinetic energy of the oil flow f2 can be utilized as drive energy for a very effective way of aspirating leakage oil. In order to explain this, the shaft seal 7 in FIG. 1 will be discussed first.

Figure 3:
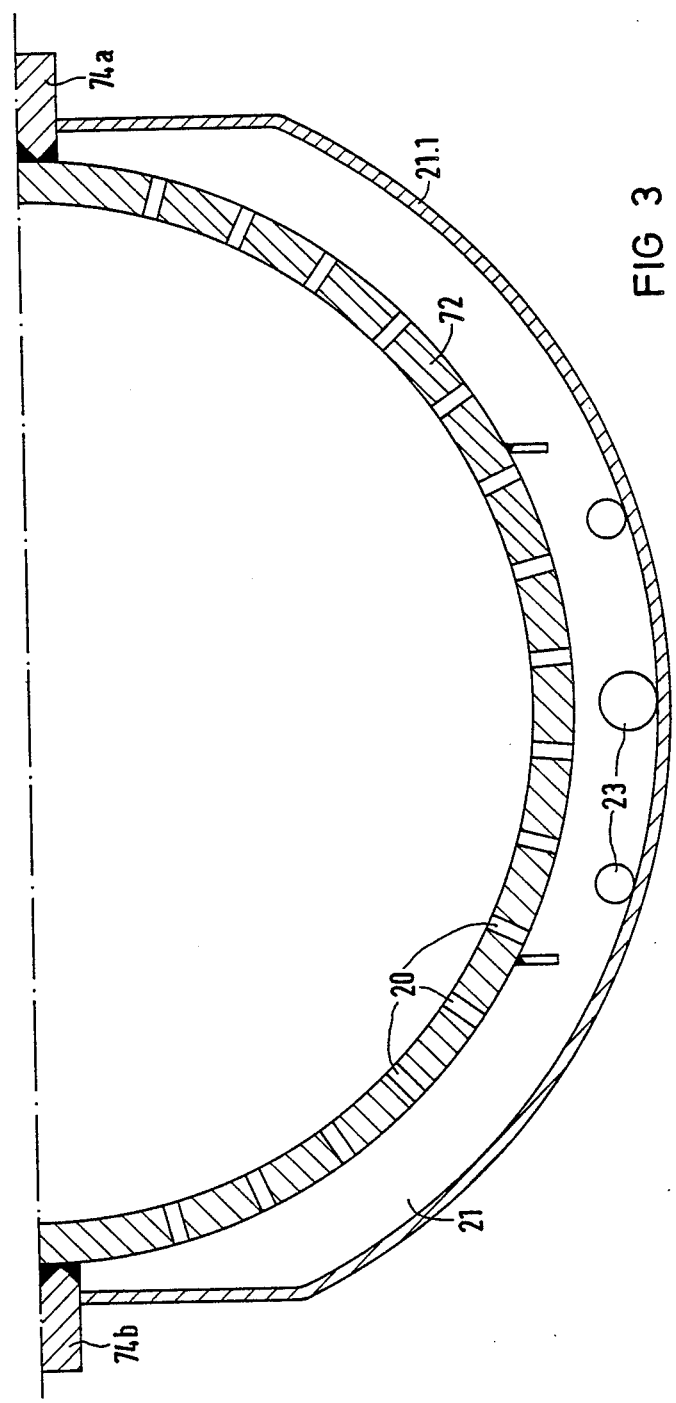
FIG. 3 is an enlarged, cross-sectional view of a leakage oil collecting chamber taken along the line III—III in FIG. 1, in the direction of the arrows.
Figure 4:
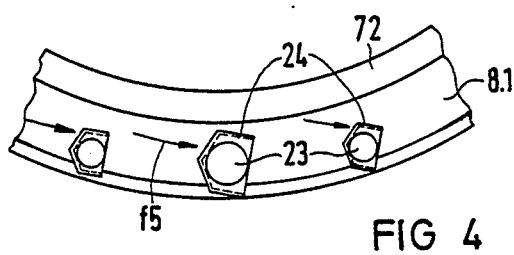
FIG. 4 is a fragmentary, side-elevational view of suction caps disposed within an annular oil collecting canal in a main oil flow, as seen along an arrow IV in FIG. 1.
Figure 6:
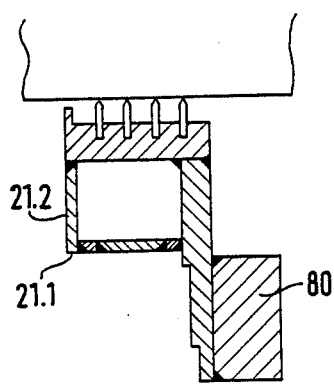
FIG. 6 is a cross-sectional view of a leakage oil collecting chamber taken along the line VI—VI in FIG. 2, in the direction of the arrows.
Figure 8:
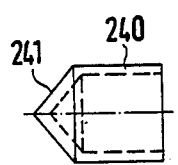
FIG. 8 is an elevational view of a hollowed out and pointed cylindrical part from which two suction caps can be obtained by dividing along the plane of the axis.
Figure 9:
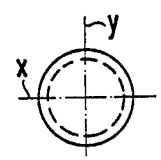
FIG. 9 is a side-elevational view of the cylindrical part of FIG. 8.
Figure 10:
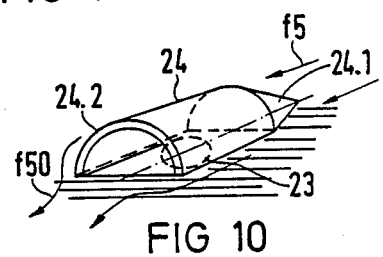
FIG. 10 is a perspective view of a single suction cap in its operating position, with a diagrammatically illustrated oil flow.
Figure 11:
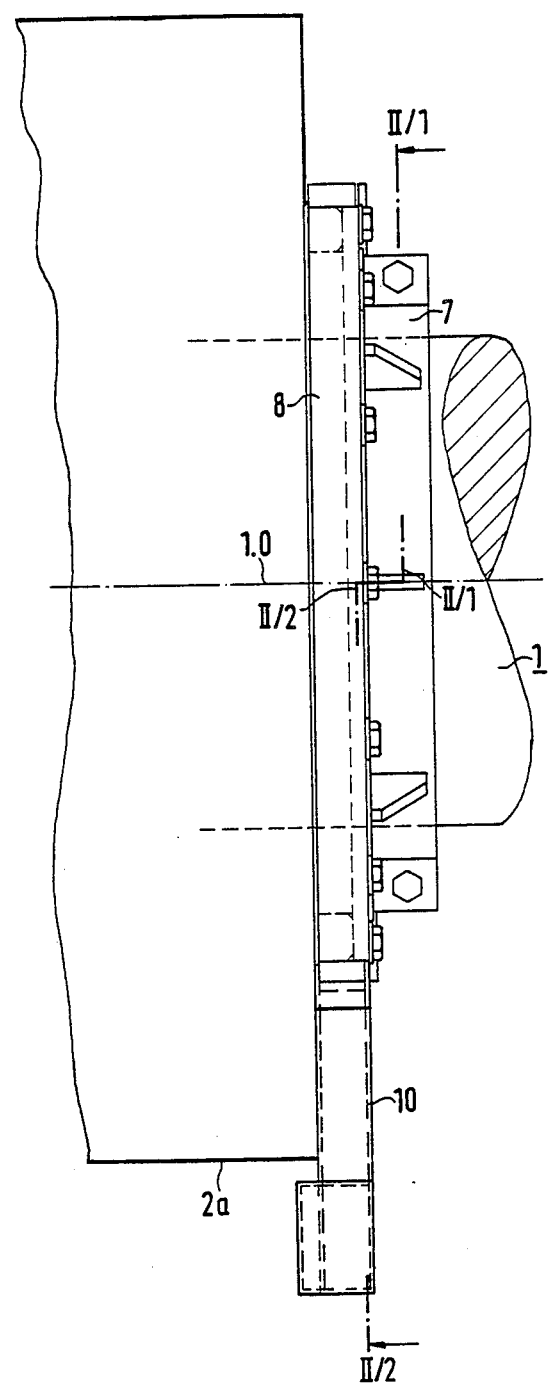
FIG. 11 is a fragmentary, top-plan view of the device according to FIGS. 1 and 2, as seen along an arrow XI in FIG. 2.

A sealing chamber is designated with reference numeral 8.2; in it are sealing rings 73 having sealing peaks or points which encompass the shaft 1 with little clearance. Four sealing rings 73 which are spaced axially relative to each other are shown. As may be seen, the sealing chamber 8.2 precedes the annual oil collecting canal 8.1. The sealing chamber 8.2 communicates through a multiplicity of oil drainage holes 20 (as seen in particular in the lower part of FIG. 1, the right part of FIG. 2 and FIG. 3) with a leakage oil collecting chamber 21. As seen in FIGS. 3 and 6, the chamber 21 is formed by an arcuate peripheral wall 21.1 and an end wall 21.2 matching the contour of the arc seen in FIGS. 1 and 6. Starting at the two lower flanges 74b of the lower half 70b of the angular ring, the peripheral wall 21.1 covers practically the entire lower half of the outer periphery of the annular wall 72. The oil drainage holes 20 are disposed in the lower half of the annular wall 72 in spaces 22 between the sealing rings 73 or peaks thereof and preferably extend radially, as shown. The peripheral wall 2.1 and the end wall 21.2 are welded to each other and to the two annular walls or legs 71, 72 of the angular ring 70. The leakage oil collecting chamber 21 is emptied through axially-oriented suction holes 23 into driving nozzles in the form of suction caps 24 which generate a suction and are located in the oil drainage flow f2. As seen especially in FIG. 10, the suction caps 24 are formed of a half-shell of a hollow part, which in the illustrated embodiment is a hollow half of a cylinder having a blower point at one end. It is important that a conical or wedge-shaped blower point 24.1 be present in the flow direction f5 of the oil drainage flow and that the outer surface 24.2 of the half shell covers over the suction hole 23 against direct inflow, while being open in the drainage direction f50 of the oil drainage flow. The suction caps need not necessarily be arched like half shells; it is much more important that they form a cavity which is shielded against the direct inflow of the oil drainage flow, so that due to a local increase of the flow velocity, suction is exerted on the outer periphery of the suction caps relative to the cavity thereof which communicates with the suction holes 23. FIGS. 8 and 9 illustrate a suitable method of producing the suction caps from a solid cylindrical part 240 which is hollowed out and provided at one of its ends with a special conical blower point 241. The hollow part is then split into two preferably symmetrical halves, it being possible to cut it in half either along the coordinate x or along the coordinate y. However, the suction caps could also be produced from flat sheet metal by cold deformation in a press. Finally, FIGS. 3 and 4 show the placement of the suction holes 23 in the lower region of the leakage oil collecting chamber 21 and FIG. 4 shows the coordination of the suction caps 24 relative to the suction holes 23 in a plan view.

The foregoing is a description corresponding in substance to German Application Nos. P 35 32 043.5, dated Sept. 9, 1985 and P 35 42 316.1, dated Nov. 29, 1985, the International priority of which is being claimed for the instant application, and which is hereby made part of this application. Any material discrepancies between the foregoing specification and the aforementioned corresponding German application are to be resolved in favor of the latter.

We claim:

1. Assembly for the leakage-free removal of bearing oil from sliding bearings for rotating shafts of high-speed machines, comprising a shaft with an outer surface rotating in a given direction throwing off an oil spray fan including oil sprays from a downwardly directed portion of said outer surface, a sliding bearing having sides and being axially divided into bearing cups along a parting line and having sliding bearing surfaces supporting said shaft and two bearing end surfaces, contactless shaft seals in the vicinity of said bearing end surfaces preventing escape to the surroundings of bearing oil fed under pressure to said sliding bearing surfaces, an annular oil collecting canal disposed at least at one of said sides of said sliding bearing between one of said shaft seals and one of said bearing end surfaces, said annular oil collecting canal having an outer contour with a geodetically lowest point and an outer peripheral wall having an arcuate cutout formed therein with a slot-shaped opening arc defining an outlet opening through which said annular oil collecting canal discharges an oil flow, said opening arc having an outlet cross section and covering a circumferential angular range of said shaft extending at least from said geodetically lowest point of said outer contour at most to a position of said outer contour defined by said parting line as seen in said given shaft rotation direction, an oil collecting box having an oil flow space therein and having an inlet opening formed therein matched to said outlet cross section of said opening arc and sealed to said opening arc for receiving oil from said outlet opening, tangentially arched baffles dividing said oil flow space into a plurality of oil flow channels for dividing said oil spray fan and downwardly deflecting said oil sprays thereof, and a common downwardly directed transition piece receiving the oil flow from said oil flow channels.

2. Assembly according to claim 1, wherein said oil flow space and at least a part of said oil flow channels are steadily reduced in size as seen from said inlet opening to said transistor piece.

3. Assembly according to claim 2, wherein said oil collection box has end walls extending along axial direction of said shaft and being reduced in size substantially in the shape of a curved bell-shaped end of a trumpet.

4. Assembly according to claim 1, including a sealing chamber axially upstream of said annular oil collecting canal, said sealing chamber having an annular wall with an inner periphery and upper and lower annular wall halves, said shaft seals being in the form of a labyrinth seal having a multiplicity of sealing rings mutually spaced apart on said inner periphery of said annular wall, said sealing rings having peaks surrounding said outer surface of said shaft with little clearance, a leakage oil collecting chamber substantially enclosing said lower annular wall half and sealing said lower annular wall half from the surroundings, said leakage oil collecting chamber communicating with said sealing chamber through a multiplicity of oil drainage holes formed in said annular wall between said sealing peaks, and said leakage oil collecting chamber having driving nozzles disposed thereon covering axially oriented suction holes formed in said leakage oil collecting chamber generating suction in said opening arc for conducting the oil flow from said oil drainage holes.

5. Assembly according to claim 4, wherein said driving nozzles are suction caps each being formed of a half shell of a hollow part covering said suction holes and having a conical blower point in an oil inlet direction and an opening in an oil flow outlet direction.

6. Assembly according to claim 4, wherein said driving nozzles are suction caps each being formed of a half shell of a hollow part covering said section holes and having a wedge-shaped blower point in an oil inlet direction and an opening in an oil flow outlet direction.

7. Assembly according to claim 1, wherein said oil collecting box has relatively narrow and relatively wide sides and rubber-elastic sealing strips pre-stressed against said outer peripheral wall of said annular oil collecting canal.

8. Assembly according to claim 7, including a partial chamber having a substantially L-shaped peripheral wall defining a substantially triangular cavity as seen in plan view, an inlet opening in an oil inlet direction and an oil outlet opening in an oil flow outlet direction, for aspirating leaked oil in said cavity with suction generated by the oil flow.

9. Assembly comprising a shaft with an outer surface rotating in a given direction throwing off an oil spray fan including oil sprays from a downwardly directed portion of said outer surface, a sliding bearing having sides and being axially divided into bearing cups along a parting line and having sliding bearing surfaces supporting said shaft and two bearing end surfaces, contactless shaft seals in the vicinity of said bearing end surfaces preventing escape to the surroundings of bearing oil fed under pressure to said sliding bearing surfaces, an annular oil collecting canal disposed at least at one of said sides of said sliding bearing between one of said shaft seals and one of said bearing end surfaces, said annular oil collecting canal having an outer contour with a geodetically lowest point and an outer peripheral wall having an arcuate cutout formed therein with a slot-shaped opening arc defining an outlet opening through which said annular oil collecting canal discharges an oil flow, said opening arc having an outlet cross section and covering a circumferential angular range of said shaft extending at least from said geodetically lowest point of said outer contour at most to a position of said outer contour defined by said parting line as seen in said given shaft rotation direction, an oil collecting box having an oil flow space therein and having an inlet opening formed therein matched to said outlet cross section of said opening arc and sealed to said opening arc for receiving oil from said outlet opening, a sealing chamber axially upstream of said annular oil collecting canal, said sealing chamber having an annular wall with an inner periphery and upper and lower annular wall halves, said shaft seals being in the form of a labyrinth seal having a multiplicity of sealing rings mutually spaced apart on said inner periphery of said annular wall, said sealing rings having peaks surrounding said outer surface of said shaft with little clearance, a leakage oil collecting chamber substantially enclosing said lower annular wall half and sealing said lower annular wall half from the surroundings, said leakage oil collecting chamber communicating with said sealing chamber through a multiplicity of oil drainage holes formed in said annular wall between said sealing peaks, and said leakage oil collecting chamber having driving nozzles disposed thereon covering axially oriented suction holes formed in said leakage oil collecting chamber generating suction in said opening arc for conducting the oil flow from said oil drainage holes.

* * * * *